(12) United States Patent
Mizunuma et al.

(10) Patent No.: US 6,211,933 B1
(45) Date of Patent: Apr. 3, 2001

(54) REFLECTIVE TYPE LIQUID CRYSTAL DISPLAY WITH SCATTERING POLARIZER

(75) Inventors: Masaya Mizunuma; Akira Tsumura; Kyoichiro Oda, all of Hyogo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/237,261

(22) Filed: Jan. 26, 1999

(30) Foreign Application Priority Data

Sep. 1, 1998 (JP) .................................................. 10-247237

(51) Int. Cl.[7] ......................... G02F 1/1335; G02F 1/1333
(52) U.S. Cl. .................................. 349/96; 349/113; 349/87
(58) Field of Search ............................... 349/96, 113, 87, 349/88

(56) References Cited

U.S. PATENT DOCUMENTS

| | | | |
|---|---|---|---|
| Re. 33,882 | * 4/1992 | Morozumi | 340/702 |
| 3,522,985 | * 8/1970 | Rogers | 350/403 |
| 3,610,729 | * 10/1971 | Rogers | 350/157 |
| 4,685,771 | * 8/1987 | West et al. | 350/347 |
| 5,157,526 | * 10/1992 | Kondo et al. | 359/63 |
| 5,486,940 | * 1/1996 | Fergason et al. | 359/74 |
| 5,995,183 | * 11/1999 | Tsuyoshi | 349/112 |
| 5,999,239 | * 12/1999 | Larson | 349/96 |

FOREIGN PATENT DOCUMENTS

| | | |
|---|---|---|
| 0825477 | * 2/1998 | (EP) . |
| 0862076 | * 9/1998 | (EP) . |
| 9-218395 | * 8/1997 | (JP) . |
| 10-003078 | 6/1998 | (JP) . |

OTHER PUBLICATIONS

Victor et al, "Elongated films of Polymer–Dispersed Liquid Crystals as Scattering Polarizes", Molecular Engineering 1: 305–310, Mar. 1991.*

"Classification of Reflective Type LCDs and Use Efficiency of Light", T. Uchida, et al., Gekkan LCD Intelligence, Apr., 1997, pp. 54–58.

* cited by examiner

Primary Examiner—William L. Sikes
Assistant Examiner—Tarifur R. Chowdhury
(74) Attorney, Agent, or Firm—McDermott, Will & Emery

(57) ABSTRACT

A reflective type liquid crystal display providing brighter display than a conventional device and usable in a dark place is provided. The reflective type liquid crystal display includes liquid crystal and a scattering-polarizer as a main optical element which transmits a polarized light component in one direction to the backside of the liquid crystal and reflects with scattering a polarized light component orthogonal to that one direction in the opposite direction to the advancing direction of the light.

6 Claims, 10 Drawing Sheets

VOLTAGE-OFF STATE

VOLTAGE-ON STATE

VOLTAGE-OFF STATE

VOLTAGE-ON STATE

FIG. 3A
FIG. 3B
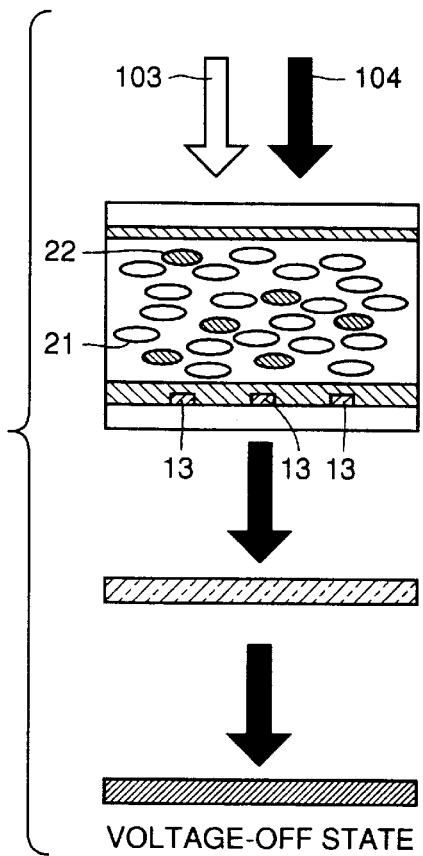
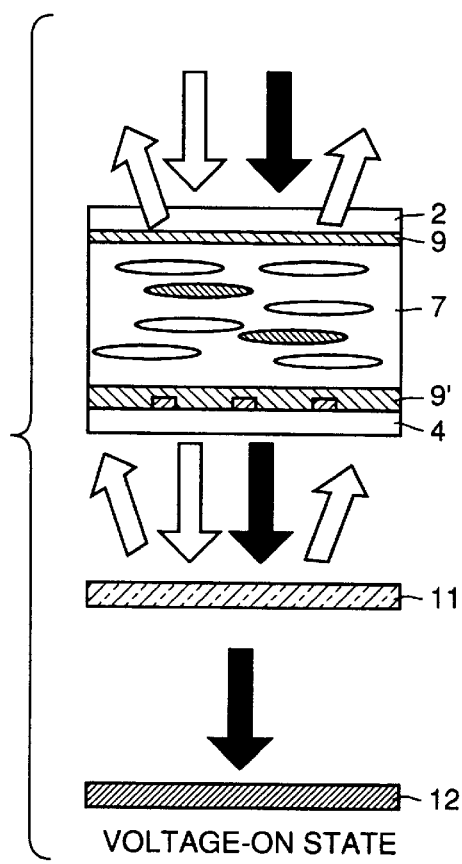
VOLTAGE-OFF STATE
VOLTAGE-ON STATE
FIG. 3C
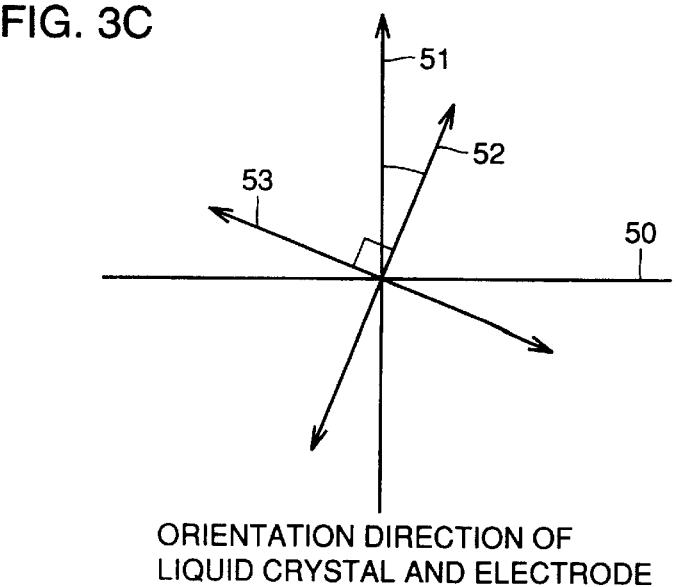
ORIENTATION DIRECTION OF
LIQUID CRYSTAL AND ELECTRODE FIG. 4A
FIG. 4B
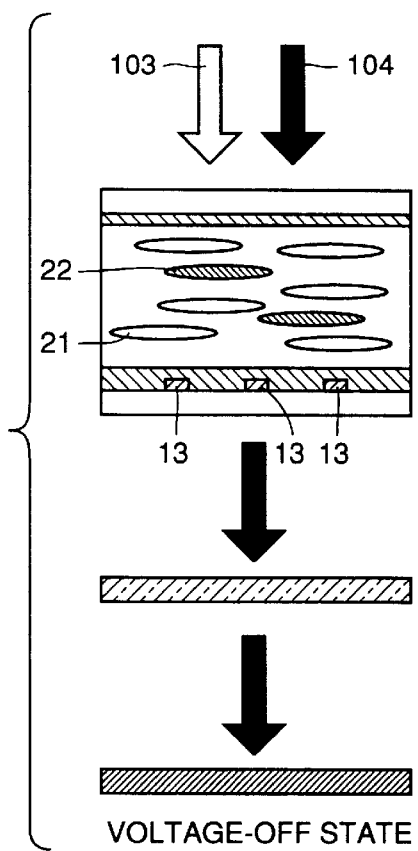
VOLTAGE-OFF STATE
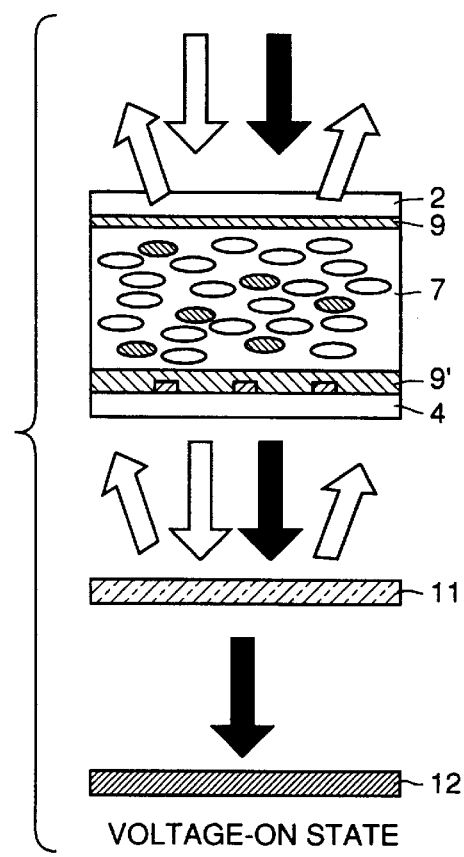
VOLTAGE-ON STATE
FIG. 4C
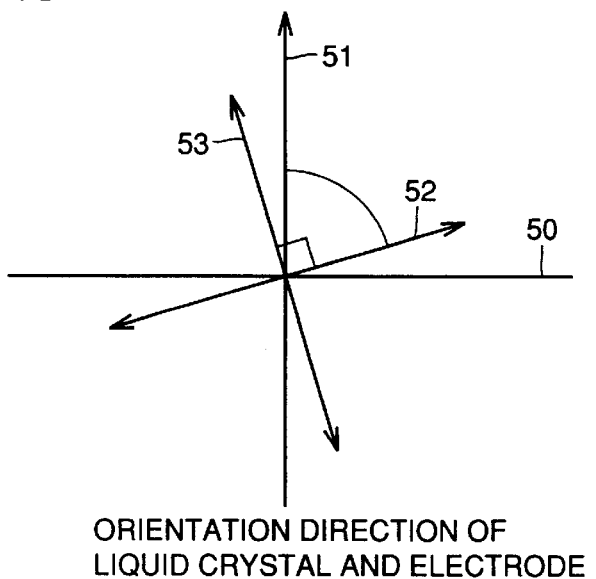
ORIENTATION DIRECTION OF
LIQUID CRYSTAL AND ELECTRODE

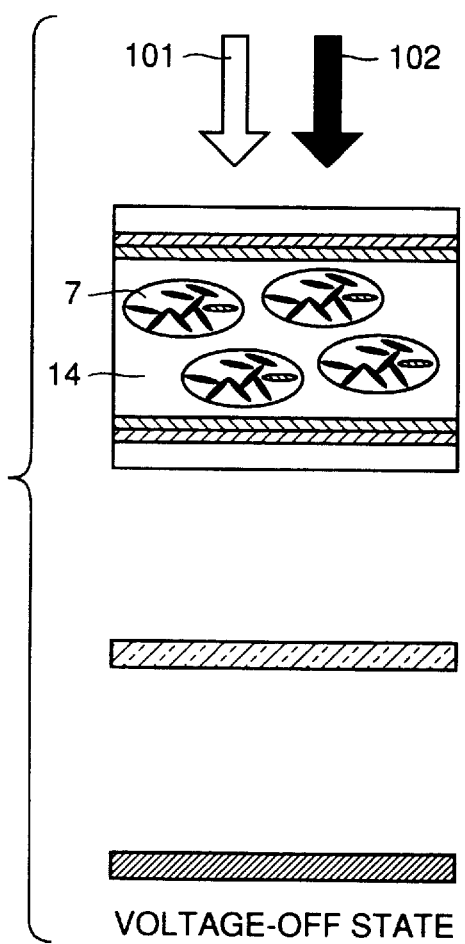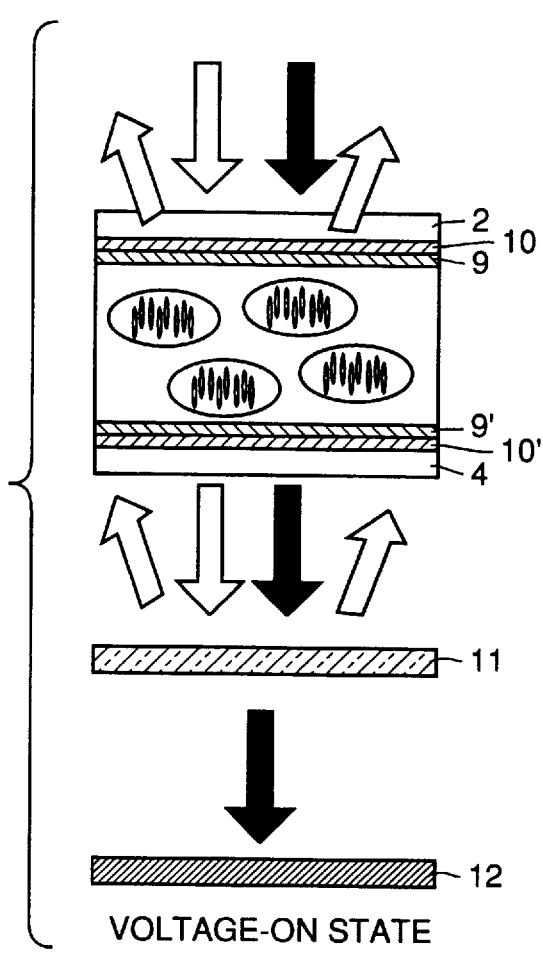
FIG. 5A VOLTAGE-OFF STATE
FIG. 5B VOLTAGE-ON STATE

FIG. 6A
FIG. 6B
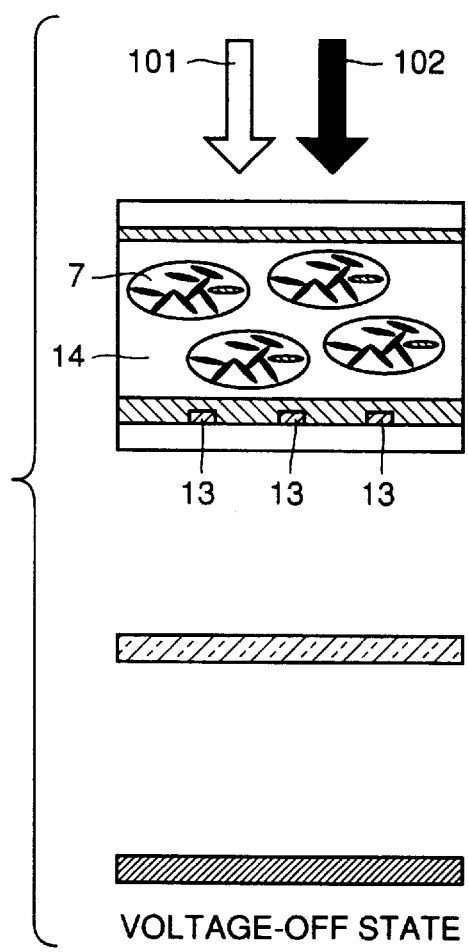
VOLTAGE-OFF STATE
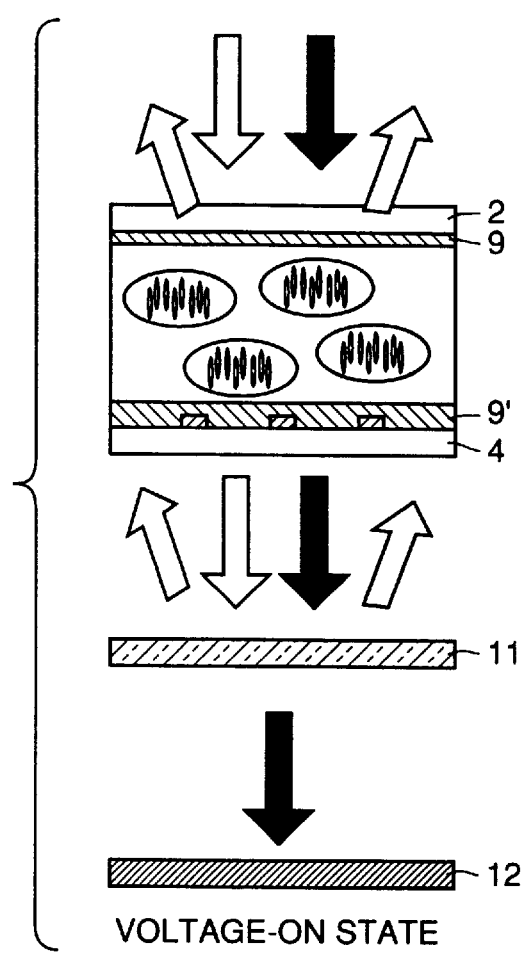
VOLTAGE-ON STATE

VOLTAGE-OFF STATE
BACKLIGHT OFF

VOLTAGE-ON STATE
BACKLIGHT OFF

FIG. 8A
FIG. 8B
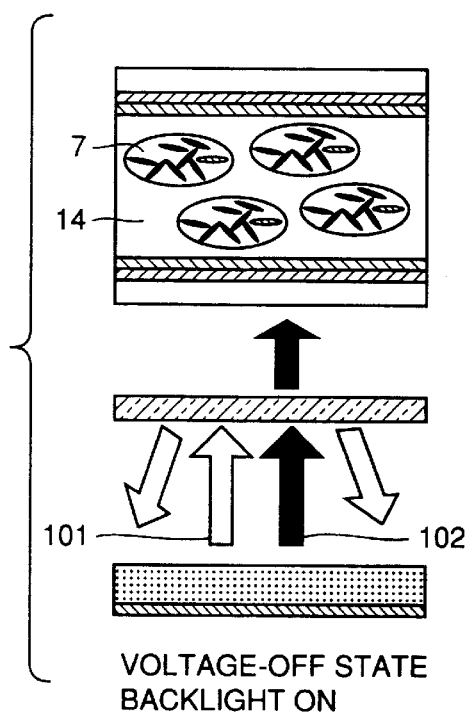
VOLTAGE-OFF STATE
BACKLIGHT ON
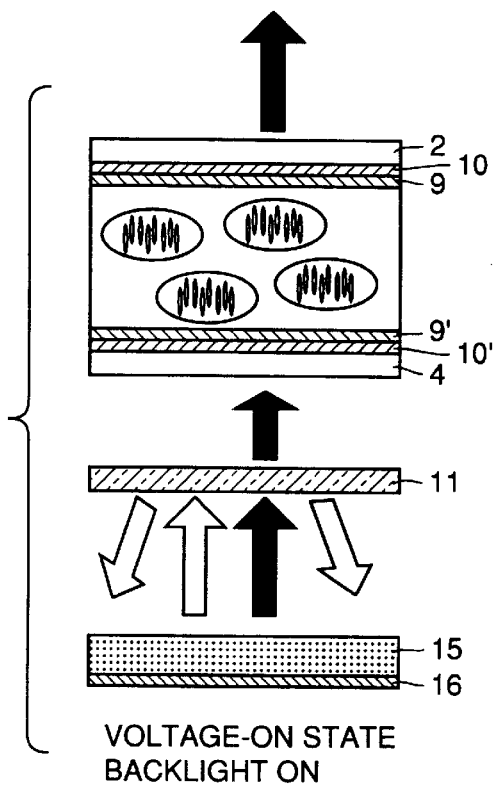
VOLTAGE-ON STATE
BACKLIGHT ON FIG. 9A
FIG. 9B
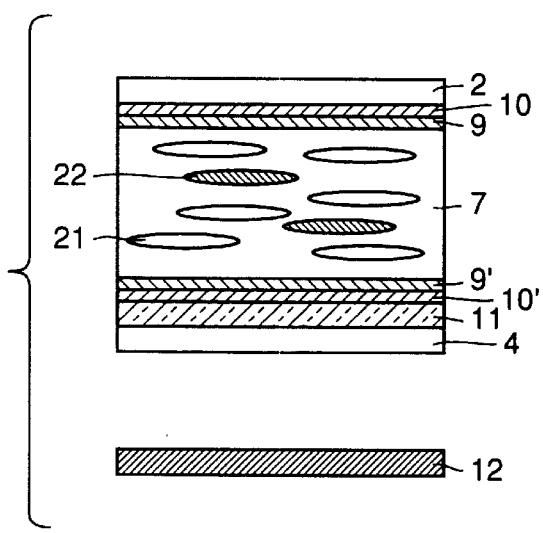
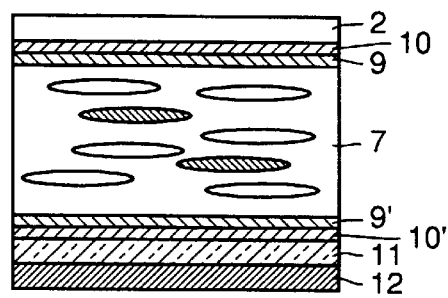
FIG. 10A  PRIOR ART
FIG. 10B  PRIOR ART
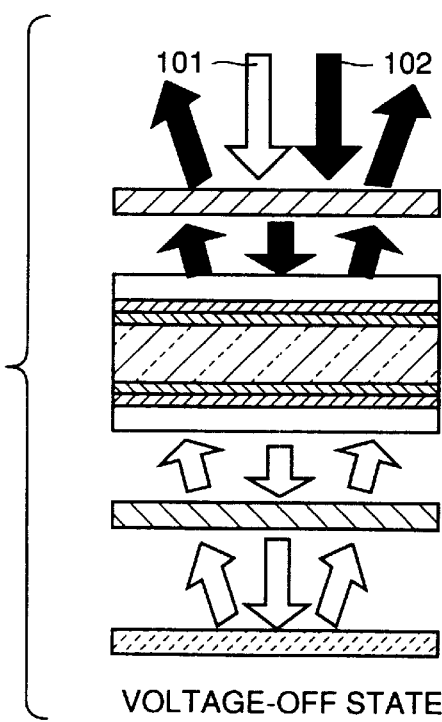
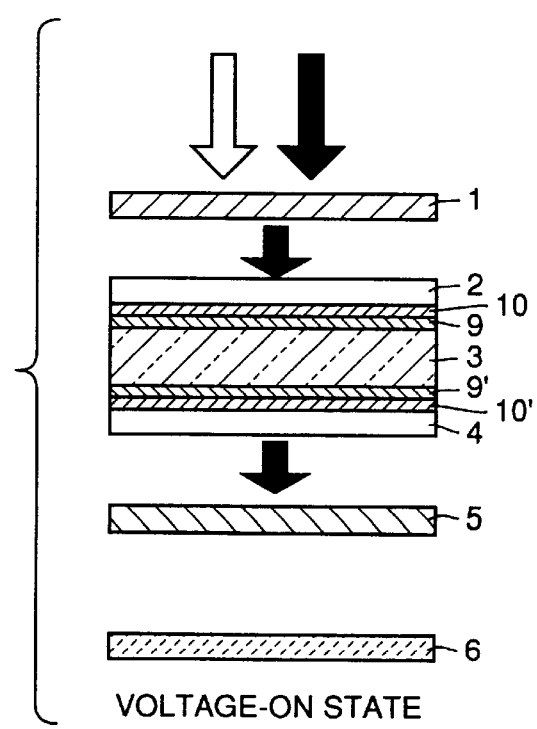
VOLTAGE-OFF STATE
VOLTAGE-ON STATE

VOLTAGE-OFF STATE

VOLTAGE-ON STATE

REFLECTIVE TYPE LIQUID CRYSTAL DISPLAY WITH SCATTERING POLARIZER

BACKGROUND OF THE INVENTION

1. Field of the Invention

The present invention relates generally to reflective type liquid crystal displays used as an information display board in information instruments, electric home appliances or the like, and more particularly, to a reflective type liquid crystal display capable of bright display without the absorption of light by a polarizer.

2. Description of the Background Art

Liquid crystal itself does not emit light but functions as a display by controlling incoming light transmitted therethrough. Methods of allowing light to come into the liquid crystal are roughly divided into two kinds, one of which is direct view type or transmissive type methods to let liquid crystal to transmit light emitted from the backlight provided in the backside, and the other is reflective type methods to reflect transmitted light incoming from the side of the viewer at the back of the liquid crystal and let the liquid crystal to transmit the reflected light to the viewer side. The development of reflective type liquid crystal displays has been vigorously proceeded, because this type of displays are power-saving, thin and lightweight without having to provide a backlight. In addition to the above advantages in terms of functions, the cost may be reduced, because members for the backlight are not necessary.

A number of conventional constructions have been proposed for such a reflective type liquid crystal display. (For example, various reflective type liquid crystal displays are described in LCD Intelligence: April 1997, pp. 54–58.) In the reflective type liquid crystal display, reflected light should have a scattering property in order to secure good visibility by the viewer, in other words, in order to permit light from all the parts of the picture plane to sufficiently reach the viewer. Therefore, the reflective type liquid crystal display must include an optical member for providing any of the components with a scattering characteristic. The constitutions of reflective type liquid crystal displays may be classified into the following three kinds in view of where such scattering characteristic is provided in the device: (1) such scattering characteristic is provided at the rearward of liquid crystal as viewed from the viewer, (2) the scattering characteristic is provided in the front of liquid crystal, and (3) the scattering characteristic is provided to the liquid crystal itself.

FIGS. 10A and 10B are views showing an example of a reflective type liquid crystal display in the type of (1). FIG. 10A shows an off state where a voltage is not applied to liquid crystal, and FIG. 10B shows an on state.

In FIGS. 10A and 10B, the viewer is in the upper part, in other words in the front of the liquid crystal, and light comes in from the upper part.

A polarizer 1 absorbs a polarized light component 101 parallel to the surface of the sheet and transmits a polarized light component 102 orthogonal to the surface of the sheet. Liquid crystal 3 is general TN (Twisted Nematic) liquid crystal having a twist angle of 90°. The direction of the absorbing axis of a polarizer 5 is orthogonal (cross Nicol) to that of polarizer 1. Liquid crystal 3 is held between and in contact with orientation layers 9 and 9' for aligning the orientations of liquid crystal molecules. Transparent electrodes 10 and 10' are provided in the front and backsides of the liquid crystal/orientation layers, respectively, and apply a voltage to the liquid crystal. Transparent substrates 2 and 4 composed of glass, plastic or the like are provided in the front side and backside of the transparent electrodes, respectively. Provided in the backside of polarizer 5 is a reflecting board 6 having a surface of scattering type white resin or a metallic surface with a high reflectance such as silver and aluminum treated to have a scattering property.

Polarized light component 102 orthogonal to the surface of the sheet comes into liquid crystal 3, and has its plane of polarization twisted by 90° by the TN liquid crystal having a twist angle of 90° in the off state where a voltage is not applied between transparent electrodes 10 and 10'. Therefore, polarized light component 102 is converted into polarized light component 101 parallel to the surface of the sheet and transmitted through polarizer 5. Subsequently, polarized light component 101 parallel to the surface of the sheet, scattered by reflecting board 6 is once again transmitted through polarizer 5, converted into polarized light component 102 orthogonal to the surface of the sheet by liquid crystal 3, transmitted through polarizer 1, the light reaches the viewer and white display is made.

Meanwhile, in the on state where a voltage is applied between transparent electrodes 10 and 10', the twist of TN liquid crystal 3 is untwined, polarized light component 102 incident to the liquid crystal is transmitted through liquid crystal 3 without changing the direction of polarization and absorbed by polarizer 5. As a result, the light does not reach the viewer and black display is made.

At this time, if a color filter is inserted between the viewer and the reflecting board, color display is enabled.

If the directions of the absorbing axes of polarizers 1 and 5 are parallel rather than orthogonal, black display is achieved when the application of a voltage is off and white display is achieved when the application of a voltage to the liquid crystal is on, respectively. Color display is enabled in combination with the color filter.

FIGS. 11A and 11B show conventional reflective type liquid crystal displays in the type of (1), using a liquid crystal mode different from the above. In FIGS. 11A and 11B, the viewer is present in the upper part, in other words, in the front of liquid crystal, and incident light comes in from the upper part. Polarizer 1 transmits a polarized light component 101 parallel to the surface of the sheet and absorbs a polarized light component 102 orthogonal to the surface of the sheet. Liquid crystal 7 is guest-host type liquid crystal formed by adding a dichroic dye to nematic liquid crystal having positive dielectric anisotropy, orientation layers 9 and 9' are provided at the interface between the upper and lower substrates, and the liquid crystal is oriented in the direction parallel to the surface of the sheet.

Polarized light component 101 parallel to the surface of the sheet is transmitted through polarizer 1, comes into guest-host type liquid crystal 7 and is absorbed by the dichroic dye added to the liquid crystal when a voltage is not applied to guest-host type liquid crystal 7. As a result, the light does not reach the viewer, and black display is made.

Meanwhile, when a voltage is applied to guest-host type liquid crystal 7, liquid crystal molecules in guest-host type liquid crystal 7 are oriented in the direction of the electric field, in other words in the direction almost orthogonal to the substrate, while the added dichroic dye is also oriented in the same direction as the liquid crystal molecules, incoming polarized light component 101 is transmitted through guest-host type liquid crystal 7, scattered by reflecting board 6, once again transmitted through guest-host type liquid crystal 7 and polarizer 1 to reach the viewer, and therefore white display is made. Also as described above, by inserting a color filter between the viewer and the reflecting board, color display is enabled.

In the above conventional examples, a polarizer is necessary to turn on and off light transmitted through liquid crystal to display in white and black. When a polarizer is used in the reflective type liquid crystal display as described above, light is transmitted through the polarizer four times or twice in total before reaching the viewer. An ideal polarizer would not absorb light, but in practice about several to 10% light is absorbed and therefore the number of transmission of light through the polarizer is preferably as small as possible in order to provide bright display.

Furthermore, a conventional reflective type liquid crystal display cannot be used in a dark place, because there is little incident light. In order to solve this disadvantage, such a reflective type liquid crystal display is proposed in which a half mirror is used for the reflecting board or an opening is provided at a part of the reflecting board to transmit a part of light and a backlight is provided in the backside to use the display also as a transmissive type device. However, the reflecting board of such a structure has a low reflecting performance, the picture plane is disadvantageously darkened.

SUMMARY OF THE INVENTION

It is one object of the invention to provide a reflective type liquid crystal display which permits brighter display than a conventional device.

Another object of the invention is to provide a reflective type liquid crystal display of a simple and new structure, which permits bright display to be obtained in a dark place as well with a backlight provided in the backside.

In a reflective type liquid crystal display according to one aspect of the invention, light incoming from the front of liquid crystal is reflected in the backside, the reflected light is transmitted through the liquid crystal from the backside, and the display of the liquid crystal portion is viewed from the front side. The display includes, as essential optical elements, liquid crystal and a scattering-polarizer which transmits a polarized component of light in one direction, and reflects in a scattering manner a polarized light component orthogonal to that one in the direction opposite to the advancing direction of the light. Herein, "including liquid crystal and a scattering-polarizer as essential optical components" means that an ordinary polarizer transmitting one polarized component but absorbing the other polarized component whose polarization plane is perpendicular to that one is not used. Hereinafter, the term "polarizer" refers to this ordinary polarizer and is to be distinguished from the scattering-polarizer.

Thus, light does not transmit through a polarizer which causes a reduction in the use efficiency of light and therefore bright picture display results.

The reflective type liquid crystal display as described above further includes a light absorber provided in the backside of the scattering-polarizer in order to achieve a higher contrast.

By thus providing the light absorber at this position, the state of black is further enhanced into completeness and the contrast between black and white may be enhanced.

In the reflective type liquid crystal display described above, the liquid crystal is often guest-host type liquid crystal composed of a mixture of nematic liquid crystal and a dichroic dye in various applications.

The use of the guest-host type liquid crystal eliminates the necessity of separately providing a polarizer, because the nematic liquid crystal molecules function as a polarizer when the molecules are parallel to the electrodes. When two orthogonal polarized light components are both transmitted through the guest-host type liquid crystal, one of the polarized components is reflected with scattering upon the scattering-polarizer in the backside of the liquid crystal but the other component is transmitted, and therefore the polarizer is similarly not necessary. As a result, light making white display, which is reflected with scattering upon the scattering-polarizer, is not transmitted twice or four times through the polarizer, and bright display results.

The guest-host type liquid crystal often has a mixture of nematic liquid crystal and a dichroic dye dispersed within a polymer matrix.

By using such liquid crystal, two orthogonal polarized light components are both absorbed in the voltage-off state, while the two orthogonal polarized light components are both transmitted in the voltage-applied state, therefore the transmitted two polarized light components are separated by a scattering-polarizer, the light reflected with scattering is emitted to the side of viewer, and a display function may achieved. At this time, since a polarizer is not used in any of the parts, absorption by such a polarizer is eliminated and bright display results.

By using the liquid crystal having the mixture dispersed within the polymer and providing a backlight in the backside of the scattering-polarizer, even brighter display may be provided not only in a dark place but also in a bright place. More specifically, in the reflective type liquid crystal display according to the aspect of the invention, light incoming from the front side is reflected against the backside of the liquid crystal panel, the reflected light transmits through the liquid crystal from the backside, and the display of the liquid crystal portion is viewed from the front side. The display includes a mixture of nematic liquid crystal and a dichroic dye (the mixture is also liquid crystal) or liquid crystal having the mixture dispersed within a polymer matrix, a scattering-polarizer provided in the backside of the liquid crystal which transmits a polarized light component in one direction but reflects in a scattering manner a polarized light component orthogonal to that one in the opposite direction to the advancing direction of the light, and a backlight provided in the backside of the scattering-polarizer which can be switched on and off.

In order to use light more efficiently when the backlight is turned on, the reflective type liquid crystal display further includes a reflecting member which reflects light scattered upon the scattering-polarizer among light emitted from the backlight, generating the polarized light component which is transmitted through the scattering-polarizer, and directs the reflected light together with this polarized light component toward the scattering-polarizer.

Consequently, light may be more efficiently used and brighter display results.

In the structure including the backlight, the transmission of the one polarized light component through the scattering polarizing light is often with slight scattering.

If the transmission through the scattering-polarizer involves slight scattering, light from each position of the liquid crystal portion reaches the viewer, and high visibility can be secured.

In all the reflective liquid crystal displays including such a scattering-polarizer and guest-host type liquid crystal, the following structure is preferable in order to eliminate parallax. More specifically, the liquid crystal is provided between a pair of substrates, and the scattering-polarizer is provided between the substrate positioned in the backside of the liquid crystal and the liquid crystal.

Thus, the parallax which significantly reduces display quality can be eliminated, and the definition can be maintained at a high level.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3A is a diagram showing the OFF state of a reflective type liquid crystal display according to another embodiment of the present invention;

FIG. 3B is a diagram showing the ON state of the reflective type liquid crystal display in FIG. 3A;

FIG. 3C is a diagram showing the initial orientation direction 52 of liquid crystal 7 and the longer-side direction 51 of a stripe-shaped electrode 13;

FIG. 4A is a diagram showing the OFF state of a reflective type liquid crystal display according to another embodiment of the present invention;

FIG. 4B is a diagram showing the ON state of the reflective type liquid crystal display in FIG. 4A;

FIG. 4C is a diagram showing the initial orientation direction 52 of liquid crystal 7 and the longer-side direction 51 of a stripe-shaped electrode 13;

FIG. 5A is a diagram showing the OFF state of a reflective type liquid crystal display according to another embodiment of the present invention;

FIG. 5B is a diagram showing the ON state of the reflective type liquid crystal display shown in FIG. 5A;

FIG. 6A is a diagram showing the OFF state of a reflective type liquid crystal display according to another embodiment of the present invention;

FIG. 6B is a diagram showing the ON state of the reflective type liquid crystal display shown in FIG. 6A;

FIG. 8A is a diagram showing the OFF state of a reflective type liquid crystal display according to another embodiment of the present invention;

FIG. 8B is a diagram showing the ON state of the reflective type liquid crystal display shown in FIG. 8A;

FIG. 9A is a diagram of a reflective type liquid crystal display according to another embodiment of the present invention;

FIG. 9B is a diagram showing a reflective type liquid crystal display according to another embodiment of the present invention;

FIG. 10A is a diagram showing the OFF state of a conventional reflective type liquid crystal display;

FIG. 10B is a diagram showing the ON state of the reflective type liquid crystal display shown in FIG. 10A;

DESCRIPTION OF THE PREFERRED EMBODIMENTS

Figure 1A:
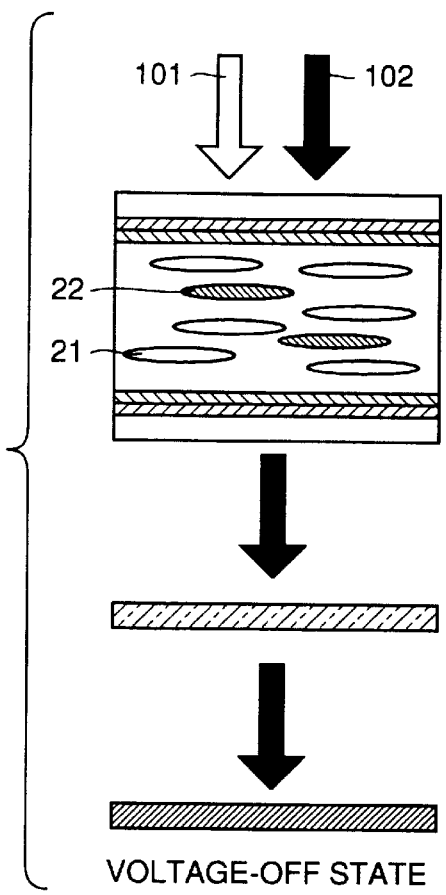
FIG. 1A is a diagram showing the state in which a voltage is not applied to liquid crystal (hereinafter referred to as the "OFF state") in a reflective type liquid crystal display according to the present invention.

Embodiments of the present invention will be now described in conjunction with the accompanying drawings.
First Embodiment Referring to FIG. 1, substrates 2 and 4 are composed of glass, plastic or the like, liquid crystal 7 is guest-host liquid crystal composed of a mixture of nematic liquid crystal 21 having positive dielectric anisotropy and a dichroic dye 22, and orientation layers 9 and 9' are composed of polyimide or the like. Orientation layers 9 and 9' are provided with an alignment treatment such that the lengthwise direction of liquid crystal molecules is parallel to the surface of the sheet. Transparent electrodes 10 and 10' apply a voltage orthogonal to the surface of the liquid crystal, a scattering-polarizer 11 transmits one polarized component of incident light, and radially scatters the other polarized component of the light in the direction opposite to the advancing direction of the light. A light absorbing plate 12 absorbs the entire visible wavelength of light or reflects light in a particular wavelength, and absorbs light in the other wavelength to enable color display.

Figure 1B:
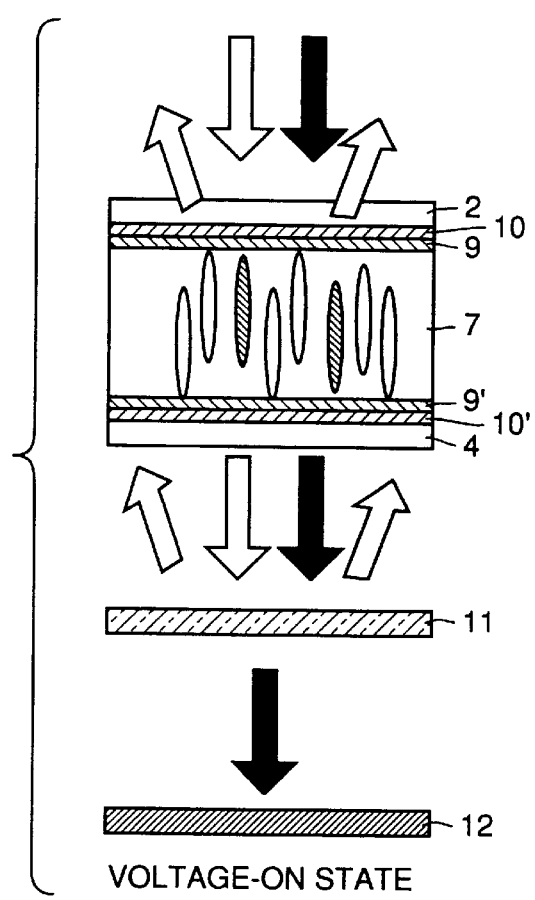
FIG. 1B is a diagram showing the state in which a voltage is applied to liquid crystal (hereinafter referred to as the "ON state") in the reflective type liquid crystal display shown in FIG. 1A.

In FIGS. 1A and 1B, the viewer is present in the upper part (front side), and light comes in from the upper part. Scattering-polarizer 11 is positioned to scatter a polarized light component 101 parallel to the surface of the sheet to the backside and to transmit a polarized light component 102 orthogonal to the surface of the sheet.

In the state where a voltage is not applied between transparent electrodes 10 and 10' shown in FIG. 1A, guest-host type liquid crystal 7 is oriented almost parallel to the substrates and the surface of the sheet. At this time, polarized light component 101 parallel to the surface of the sheet coming into guest-host type liquid crystal 7 is absorbed by the liquid crystal. Meanwhile, polarized light component 102 orthogonal to the surface of the sheet is transmitted through guest-host type liquid crystal 7 and then through scattering-polarizer 11 and absorbed by a light absorbing plate 12. As a result, the light does not reach the viewer and black display is made.

In the state where a voltage is applied between transparent electrodes 10 and 10' shown in FIG. 1B, guest-host type liquid crystal 7 is oriented almost orthogonal to the substrate by the function of the electric field. At this time, polarized light component 101 parallel to the surface of the sheet and polarized light component 102 orthogonal to the surface of the sheet coming into guest-host liquid crystal 7 are both not absorbed but transmitted through guest-host type liquid crystal 7. Subsequently, polarized light component 101 parallel to the surface of the sheet is scattered by scattering-polarizer 11 to the backside, and once again transmitted through guest-host type liquid crystal 7. Meanwhile, polarized light component 102 orthogonal to the surface of the sheet is transmitted through scattering-polarizer 11 as is the case with the voltage-off state, and absorbed by light absorbing plate 12. As a result, polarized light component 101 parallel to the sheet of the surface scattered by scattering-polarizer 11 reaches the viewer, and thus white display is made.

The scattering-polarizer described above may be of any type which reflects with scattering one of the two polarized light components in the opposite direction to the advancing direction (toward the backside) rather than simply reflects the same, and transmits the component orthogonal thereto or transmits the same in a slightly scattering manner. Note however that the slightly scattered state in the transmission is not shown. Such slightly scattering phenomenon during the transmission is not much taken into account in the normal use of the reflective type liquid crystal display, but the phenomenon is important in improving the visibility of the picture plane when a backlight in a device having it is used.

The scattering-polarizer has preferably a transparent material different from a binder, a primary material, evenly dispersed in a polymer film, and the refractive index of the transparent material has anisotropy. The scattering-polarizer may be readily manufactured without a complicated process such as vapor deposition and a high level liquid crystal alignment technique. The material is relatively easily available and inexpensive. A scattering-polarizer and a conventional polarizer may be integrally joined together and used as the scattering-polarizer.

When color display is made, light absorbing plate 12 reflects with scattering only a particular wavelength and absorbs the other wavelengths, then polarized light component 101 parallel to the surface of the sheet among the reflected wavelength once again, transmits scattering-polarizer 11 and guest-host type liquid crystal 7 to reach the viewer, and color display is achieved corresponding to the reflected wavelengths by the visible light. In this case, the device is in an operation mode for displaying in white and a color of that particular wavelength. By using a light absorbing plate which reflects with scattering light in different wavelengths corresponding to a plurality of pixels, display in white, colors and a mixture thereof may be achieved.

A light absorbing plate which absorbs all the wavelengths may be used, and a color filter may be inserted at a position between the viewer and scattering-polarizer 11 similarly to the conventional device. In this case, display modes in black, color and a mixture thereof are achieved.

If a dichroic dye added to liquid crystal is a material absorbing light in a particular wavelength, display in white and a color complementary to light absorbed by the dichroic dye may be achieved. Thus, by combining a reflecting board reflecting a particular wavelength and a color filter or the like, color display is enabled. The above combination is applicable to the following embodiments of the present invention.

As described above, scattering-polarizer 11 has two functions, in other words, functions as a polarizer and a scattering reflecting board a reflecting board is not necessary in black and white display. Light for white display is not transmitted through the scattering-polarizer, the light is not attenuated by the scattering-polarizer, and display brighter than the conventional device is therefore enabled. If a guest-host type liquid crystal type is used in a reflective liquid crystal display, the optical path length is twice as long as that of the direct view type, the content of a dichroic dye may be smaller than that of the direct view type, and the thickness of the liquid crystal layer may be reduced, such that the driving voltage may be reduced as well. If scattering-polarizer 11 and light absorbing plate 12 are previously joined into a sheet shape, the reflective type liquid crystal display may be more easily assembled.

Second Embodiment

Figure 2A:
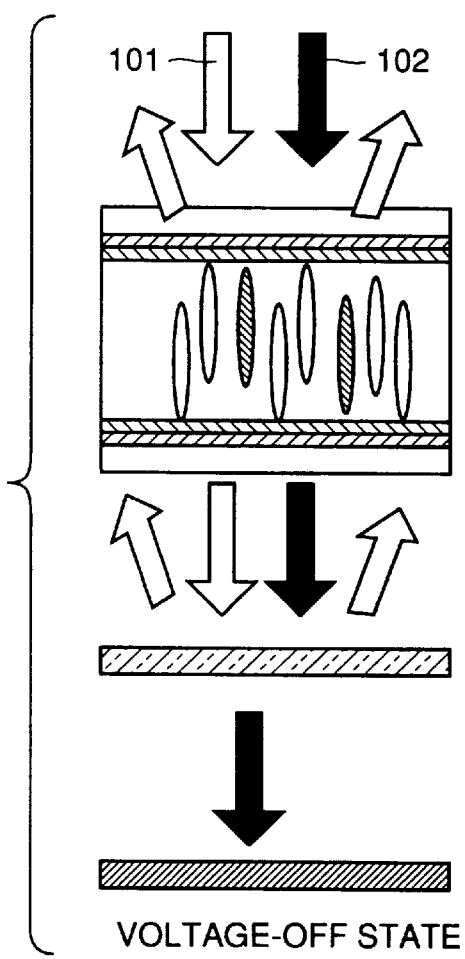
FIG. 2A is a diagram showing the OFF state of a reflective type liquid crystal display according to another embodiment of the present invention.
Figure 2B:
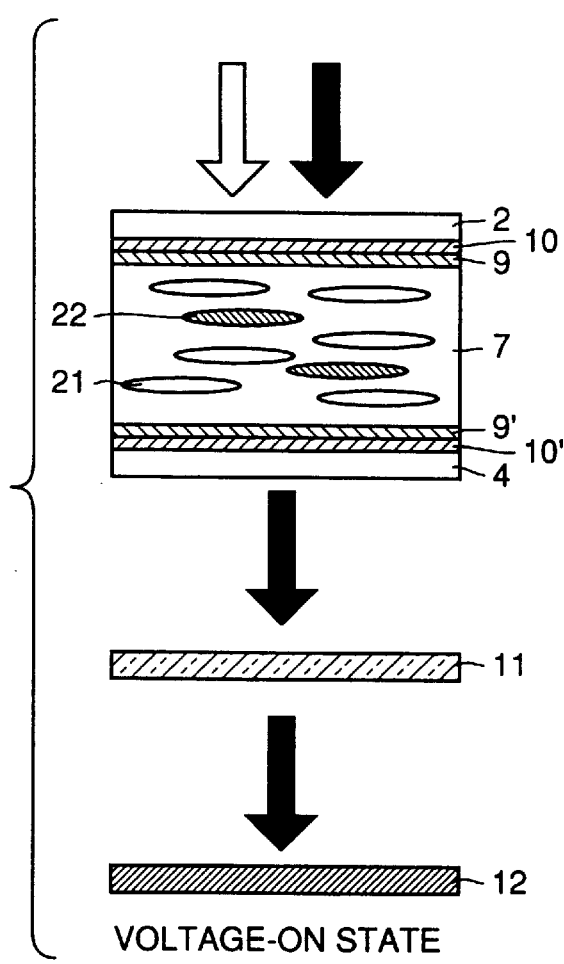
FIG. 2B is a diagram showing the ON state of the reflective type liquid crystal display shown in FIG. 2A.

Referring to FIGS. 2A and 2B, substrates 2 and 4 are composed of glass, plastic or the like, liquid crystal 7 is guest-host type liquid crystal formed by a mixture of nematic liquid crystal 21 having negative dielectric anisotropy and a dichroic dye 22, and orientation layers 9 and 9' are composed of polyimide or the like. Orientation layers 9 and 9' are provided with an alignment treatment such that the liquid crystal is oriented almost orthogonally to the substrates and at a slight inclination (pre-tilt angle) to the direction parallel to the surface of the sheet. Otherwise, the same reference numerals represent the same portions as those in the first embodiment, in other words, as those in FIGS. 1A and 1B.

When a voltage is not applied between transparent electrodes 10 and 10' as shown in FIG. 2A, guest-host type liquid crystal 7 is oriented almost orthogonally to the substrates. At this time, polarized light component 102 orthogonal to the surface of the sheet and polarized light component 101 parallel to the surface of the sheet coming into guest-host type liquid crystal 7 are not absorbed but transmitted through guest-host type liquid crystal 7. Polarized light component 101 parallel to the surface of the sheet is then scattered by scattering-polarizer 11, and is again transmitted through guest-host type liquid crystal 7. Meanwhile, polarized light component 102 orthogonal to the surface of the sheet is transmitted through scattering-polarizer 11, and is absorbed by light absorbing plate 12. Therefore, polarized light component 101 parallel to the surface of the sheet, reflected by scattering-polarizer 11 reaches the viewer and white display is made.

When a voltage is applied between transparent electrodes 10 and 10' as shown in FIG. 2B, guest-host type liquid crystal 7 having negative dielectric anisotropy is oriented almost horizontally to the substrates by the function of the electric field. At this time, polarized light component 101 coming into guest-host type liquid crystal 7, parallel to the surface of the sheet, is absorbed by guest-host type liquid crystal 7. Meanwhile, polarized light component 102 orthogonal to the surface of the sheet is transmitted through guest-host type liquid crystal 7, then through scattering-polarizer 11, and is absorbed by light absorbing plate 12. As a result, the reflected light does not reach the viewer, and black display is made.

As described above, when the guest-host type liquid crystal having the negative dielectric anisotropy is used, scattering-polarizer 11 functions both as a polarizer and a scattering reflecting board, a polarizer and a reflecting board are not necessary in black and white display. Furthermore, since the light is not transmitted through the polarizer, the attenuation of light by the polarizer is not caused, which enables brighter display than the conventional device.

In the second embodiment, the pre-tilt angle of the liquid crystal is preferably 1° or more in order to limit the direction in which the liquid crystal molecules are tilted, in other words, in order to limit the direction of the polarized light absorbed by the liquid crystal layer with high reproducibility.

Third Embodiment

Referring to FIGS. 3A and 3B, an electrode portion is formed by electrodes 13 arranged in a stripe-manner at prescribed intervals in the direction orthogonal to the surface of the sheet. Different potential differences may be provided among these stripe-shaped electrodes. Guest-host liquid crystal 7, a mixture of nematic liquid crystal 21 having positive dielectric anisotropy and a dichroic dye 22, is provided with orientation layers 9 and 9' in initial orientation direction 52 so as so have a slight angle to the longer-side direction 51 of stripe-shaped electrodes 13 as shown in FIG. 3C.

A polarized light component 103 is a component parallel the initial orientation direction of the liquid crystal, and a polarized light component 104 is a component orthogonal to the initial orientation direction of the liquid crystal. Otherwise, the same reference numerals in the figures refer to the same portions in the first embodiment. The direction of transmission axis 53 is provided such that scattering-polarizer 11 scatters polarized light component 103 parallel to the direction of the initial orientation of the liquid crystal toward the backside, and transmits polarized light component 104 orthogonal to the direction of the initial orientation of the liquid crystal.

When a voltage is not applied between transparent electrodes 13 as shown in FIG. 3A, guest-host type liquid crystal 7 is oriented in initial orientation direction 52 provided in orientation layer 9. In this state, polarized light component 103 coming into guest-host type liquid crystal 7, parallel to the initial orientation direction 52 of the liquid crystal is absorbed by guest-host type liquid crystal 7. Meanwhile, polarized light component 104 orthogonal to the initial orientation direction 52 of the liquid crystal is transmitted through guest-host type liquid crystal 7, then transmitted through scattering-polarizer 11, and absorbed by light absorbing plate 12. Therefore, the light does not reach the viewer, and black display is made.

When a voltage is applied between electrodes 13 as shown in FIG. 3B, guest-host type liquid crystal 7 turns within the substrate surface in response to an electric field generated. At this time, liquid crystal molecules close to the substrates and liquid crystal molecules present away from the substrate turn differently (with different twists) from the initial orientation. As a result, the polarized light in a particular direction is less absorbed, and the light is almost entirely transmitted through guest-host type liquid crystal 7. Polarized light component 103 parallel to the initial orientation direction 52 of the liquid crystal is reflected upon scattering-polarizer 11, and once again transmitted through guest-host type liquid crystal 7. Meanwhile, since polarized light component 104 orthogonal to the initial orientation of the liquid crystal has a plane of polarization parallel to the direction of the transmission axis 53 of the scattering-polarizer, the component is transmitted through scattering-polarizer 11 and absorbed by light absorbing plate 12. Consequently, polarized light component 103 parallel to the initial orientation of the liquid crystal reflected upon scattering-polarizer 11 reaches the viewer, and white display is made.

As described above, when guest-host type liquid crystal is used as in-plane switching type liquid crystal, scattering-polarizer 11 functions both as a polarizer and a scattering reflecting board, and therefore a reflecting board is not necessary in black and white display. Furthermore, since light in white display is not transmitted through the scattering-polarizer, the light is not attenuated and brighter display than the conventional device is enabled.

The use of a light absorbing material is not preferable for stripe-shaped electrodes 13 according to the invention, because the material could lower brightness in white display.

Any other material such as a shielding material or a transparent material may be used for the stripe-shaped electrodes.

Fourth Embodiment

Referring to FIGS. 4A and 4B, electrodes 13 are provided at prescribed intervals in the direction orthogonal to the surface of the sheet in a stripe form. Different potential differences may be provided among these electrodes in the striped form. As shown in FIG. 4C, guest-host type liquid crystal 7, a mixture of nematic liquid crystal 21 having negative dielectric anisotropy and a dichroic dye 22, is provided with orientation layers 9 and 9' to have a slight angle relative to the shorter-side direction 50 of stripe form electrodes 13 and is provided with an alignment treatment. Polarized light component 103 is a polarized light component parallel to the initial orientation direction 52 of the liquid crystal, while polarized light component 104 refers to a polarized light component orthogonal to the initial orientation of the liquid crystal. Otherwise, the same reference numerals in FIG. 4 refer to portions the same as those in the first embodiment. The direction of transmission axis 53 of scattering-polarizer 11 is positioned to scatter polarized light component 103 parallel to the initial orientation direction 52 of the liquid crystal to the backside and transmits polarized light component 104 orthogonal to the initial orientation direction 52 of the liquid crystal.

Thus, as is the case with the third embodiment, the operations in FIGS. 4A and 4B enable black and white display, and brighter and better characteristic than the conventional device result.

Fifth Embodiment

Referring to FIGS. 5A and 5B, in this embodiment, liquid crystal 7 used is produced by dispersing nematic liquid crystal having positive dielectric anisotropy and a dichroic dye in a polymer matrix 14. Herein, the refractive indices of the polymer matrix and nematic liquid crystal in the directions of shorter axes of molecules are set almost identical. The dispersed and held liquid crystal is oriented along the interface of the polymer matrix and provides a random orientation as a whole. Otherwise, the same reference numerals in the drawings refer to portions the same as those in the first embodiment.

When a voltage is not applied between electrodes 10 and 10' as shown in FIG. 5A, guest-host type liquid crystal 7 provides a random orientation within the polymer matrix. At this time, light coming into guest-host type liquid crystal 7 is scattered because of difference between the refractive indices of the liquid crystal and polymer matrix. At this time, the light is almost entirely scattered in the advancing direction (front side scattering), and absorbed by guest-host type liquid crystal 7 regardless of the direction of polarization. As a result, the reflected light does not reach the viewer and black display is made. When a voltage is applied between electrodes 10 and 10' as shown in FIG. 5B, guest-host type liquid crystal 7 is oriented in the direction orthogonal to the substrate in response to an electric field. At this time, since the refractive indices of the liquid crystal and polymer matrix are almost the same, the incident light is not scattered or absorbed but transmitted through guest-host type liquid crystal 7. At this time, polarized light component 101 parallel to the surface of the sheet is scattered by scattering-polarizer 11, and once again transmitted through guest-host type liquid crystal 7. Meanwhile, polarized light component 102 orthogonal to the surface of the sheet is transmitted through scattering-polarizer 11 and absorbed by light absorbing plate 12. Therefore, polarized light component 101 parallel to the surface of the sheet, scattered by scattering-polarizer 11 reaches the viewer and is displayed in white.

As described above, when the in-polymer dispersed type guest-host liquid crystal is used for the vertical electric field method, scattering-polarizer 11 functions both as a polarizer and a scattering reflecting board, and therefore a reflecting board is not necessary in black and white display. Since light for white display is not transmitted through the scattering-polarizer, the light is not attenuated by the scattering-polarizer, and brighter display than the conventional device is enabled.

Sixth Embodiment

Referring to FIGS. 6A and 6B, in this embodiment, liquid crystal used is produced by dispersing, in a polymer matrix 14, guest-host type liquid crystal 7, a mixture of nematic liquid crystal having negative dielectric anisotropy and a dichroic dye, and electrodes 13 are provided at prescribed intervals in the direction orthogonal to the surface of the sheet in an arrangement of stripes and apply a voltage to the liquid crystal. Different potential differences may be provided among these electrodes in the arrangement of stripes.

When a voltage is not applied between electrodes 13 as shown in FIG. 6A, guest-host type liquid crystal 7 exhibits a random orientation within polymer matrix 14. At this time, light coming into guest-host type liquid crystal 7 is absorbed by guest-host type liquid crystal 7 regardless of the direction of polarization. As a result, the light does not reach the viewer and black display is made.

When a voltage is applied between electrodes 13 as shown in FIG. 6B, guest-host type liquid crystal 7 is oriented in the direction orthogonal to the substrate in response to the electric field. At this time, incident light is entirely transmitted through guest-host type liquid crystal 7 regardless of the direction of polarization. Subsequently, polarized light component 101 parallel to the surface of the sheet is reflected by scattering-polarizer 11 and once again transmitted through guest-host type liquid crystal 7. Meanwhile, polarized light component 102 orthogonal to the surface of the sheet is transmitted through scattering-polarizer 11 and absorbed by light absorbing plate 12. As a result, polarized light component 101 parallel to the surface of the sheet, scattered by scattering-polarizer 11 reaches the viewer and white display is made.

As described above, when the in-polymer-dispersed type guest-host liquid crystal is used for the horizontal electric field method, scattering-polarizer 11 functions both as a polarizer and a scattering reflecting board, and therefore, a reflecting board and a polarizer are not necessary in black and white display. Since the light for white display is not transmitted through the scattering-polarizer, the light is not attenuated by the scattering-polalizer and brighter display than the conventional device is enabled.

The use of a light absorbing material for electrodes 13 in the stripe arrangement according to the invention is not preferable, because brightness could be lowered in white display, as is the case with the third and fourth embodiments. Otherwise, a light shielding material or a transparent material may be used.

Seventh Embodiment

Figure 7A:
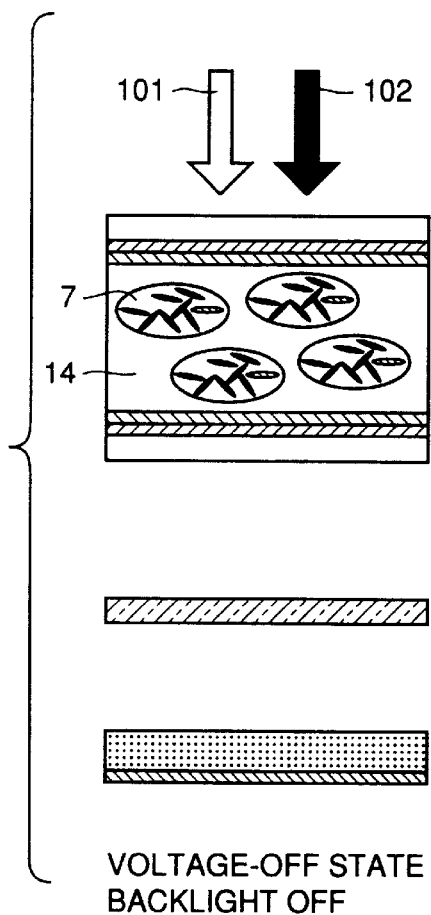
FIG. 7A is a diagram showing the OFF state of a reflective type liquid crystal display according to another embodiment of the present invention.
Figure 7B:
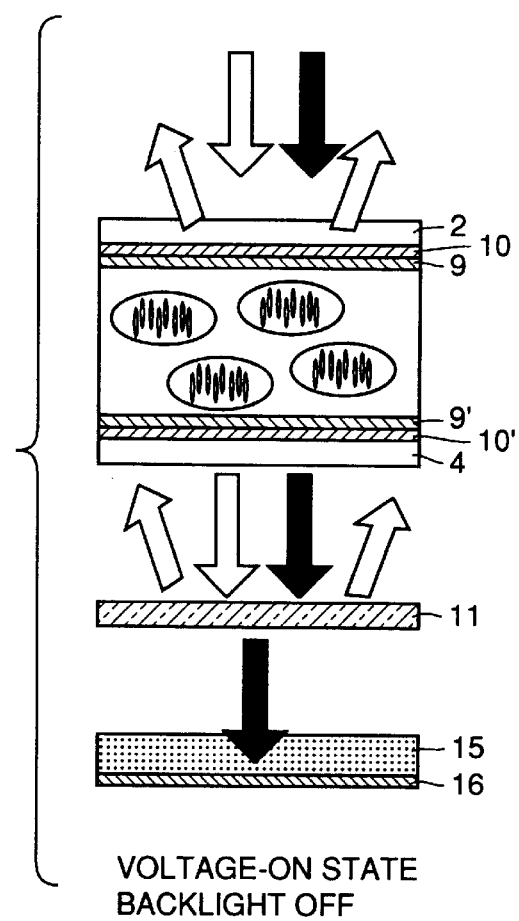
FIG. 7B is a diagram showing the ON state of the reflective type liquid crystal display shown in FIG. 7A.
Figure 11A:
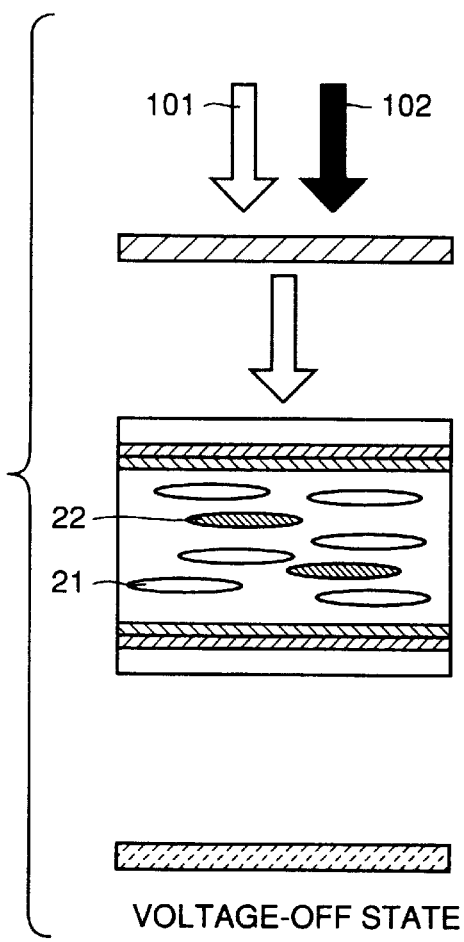
FIG. 11A is a diagram showing the OFF state of another conventional reflective type liquid crystal display.
Figure 11B:
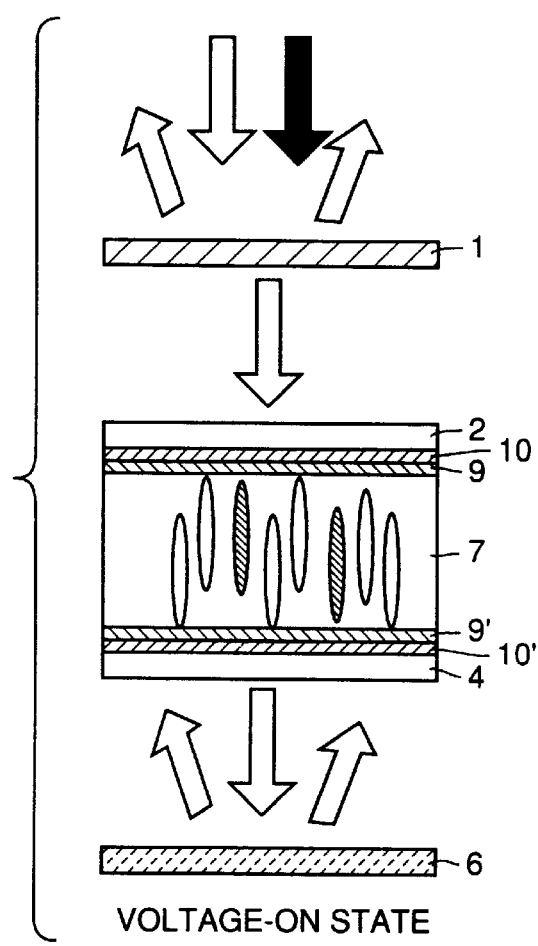
FIG. 11B is a diagram showing the ON state of the reflective type liquid crystal display shown in FIG. 11A.

A reflective type liquid crystal display as shown in FIGS. 7A and 7B operates similarly to the fifth embodiment, i.e., without the necessity of turning on a backlight 15, when the ambience is bright and external light comes into the reflective type liquid crystal display.

When the ambience is dark and almost no external light comes into the display, backlight 15 is turned on as shown in FIG. 8A. When a voltage is not applied between electrodes 10 and 10', polarized light component 101 parallel to the surface of the sheet in light emitted from backlight 15 is scattered by scattering-polarizer 11. Meanwhile, polarized light component 102 orthogonal to the surface of the sheet is transmitted through scattering-polarizer 11, but absorbed by the guest-host type liquid crystal 7 dispersed within the polymer matrix 14. As a result, the light emitted from the backlight does not reach the viewer and black display is made.

When a voltage is applied between electrodes 10 and 10' as shown in FIG. 8B, light transmitted through scattering-polarizer 11 is transmitted through the guest-host type liquid crystal, then reaches the viewer and white display is made. The light reaching the viewer when the backlight is turned on has a direction of polarization orthogonal to that of the light reflected with scattering by the scattering-polarizer when the backlight is not turned on. As a result, if there is ambient light, bright display is effectively enabled by turning on the backlight.

At this time, the light reflected with scattering by the scattering-polarizer is reflected by a reflecting member 16, and directed toward scattering-polarizer 11 as containing a polarized light component the same as 102, the amount of light transmitted through the scattering-polarizer increases, which permits the light to be more efficiently used.

When the backlight is turned on, the light transmitted through the scattering-polalizer is slightly scattered during the transmission, which improves the visibility. Note, however, that FIG. 8B does not show the slight scattering of the light during the transmission.

Herein, the case of applying an electric field using the nematic liquid crystal having positive dielectric anisotropy and the electrodes formed on the top and bottom substrates, but the invention is also effective in the case of applying a horizontal electric field between electrodes in the stripe arrangement on one substrate and having negative dielectric anisotropy as in the sixth embodiment.

As in the foregoing, when guest-host type liquid crystal dispersed in a polymer matrix is used and a backlight is provided in the backside, brighter display is enabled using the reflective type liquid crystal display without turning on the backlight in a bright ambience. As a result, bright display may be secured with lower power consumption. If the ambience is dark or even brighter display is desired in the bright ambience, bright and high contrast display is enabled by turning on the backlight.

Eighth Embodiment

In the above embodiments of the present invention, transparent electrode 10' is provided on substrate 4. In order to eliminate parallax caused by the thickness of substrate 4 located between guest-host type liquid crystal 7 and scattering-polarizer 11 controlling light, substrate 4 is desirably as thin as possible and the distance between liquid crystal 7 and scattering-polarizer 11 is preferably as small as possible.

In FIG. 9A, scattering-polarizer 11 is provided on substrate 4 as a scattering reflecting layer, in other words, provided between substrate 4 and the liquid crystal layer. In this case, as shown, transparent electrode 10' is provided on the top of the scattering reflecting layer, in other words, on the side closer to the liquid crystal portion in order to lower the driving voltage. In this case, as long as the device is used as a reflective type liquid crystal display, substrate 4 does not have to be transparent as shown in FIG. 9B, and may also function as a light absorbing plate 12. Note, however, that if the device includes a backlight and also used as a direct view type display, both substrates must be transparent.

In the above embodiments, based on the method of driving liquid crystal, a segment type, a simple matrix type, a 2-terminal element such as a MIM (metal Insulator Metal) and a 3-terminal type such as a TFT (Thin Film Transistor) may be employed, but the invention is not limited to these methods or types of devices, and applicable to any driving method or element type.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A reflective type liquid crystal display allowing light coming in from a front side of a liquid crystal display and passing through a liquid crystal layer to be reflected from a scattering polarizer positioned at a rear side of the liquid crystal layer and transmitted back through the liquid crystal layer to the front side, comprising;

said scattering-polarizer disposed only at the rear side of the liquid crystal layer to transmit a first light component polarized in a first direction and to reflect and scatter a second light component polarized in a second direction orthogonal to the first direction, wherein a front side region of the liquid crystal layer is devoid of any polarizer, and wherein the first light component is transmitted in an advancing direction of light through the scattering polarizer at the rear side of the liquid crystal layer and the second light component is reflected and scattered in a direction substantially opposite the advancing direction.

2. The reflective type liquid crystal display according to claim 1, further comprising a light absorber provided in the backside of said scattering-polarizer.

3. The reflective type liquid crystal display according to claim 1, wherein said liquid crystal is guest-host type liquid crystal composed of a mixture of nematic liquid crystal and a dichroic dye.

4. The reflective type liquid crystal display according to claim 1, wherein said liquid crystal is liquid crystal having a mixture of nematic liquid crystal and a dichroic dye dispersed in a polymer matrix.

5. The reflective type liquid crystal display according to claim 1, wherein said liquid crystal layer is provided between a first substrate disposed toward a front of the liquid crystal layer and a second substrate disposed toward a rear of the liquid crystal layer, and said scattering-polarizer is provided between the liquid crystal layer and the second substrate.

6. The reflective type liquid crystal display according to claim 1, wherein said scattering-polarizer is a single polymer film comprising a transparent material and a primary material evenly dispersed in the polymer film.

* * * * *